United States Patent [19]

McCoy et al.

[11] Patent Number: 5,485,723
[45] Date of Patent: Jan. 23, 1996

[54] VARIABLE THICKNESS ISOGRID CASE

[75] Inventors: Jeffrey P. McCoy, Ellington; Allan R. Penda, Amston, both of Conn.

[73] Assignee: United Technologies Corporation, Hartford, Conn.

[21] Appl. No.: 236,792

[22] Filed: Apr. 29, 1994

[51] Int. Cl.$^6$ .................... F02C 7/00; F02K 3/04
[52] U.S. Cl. ............. 60/226.1; 60/39.091; 415/9; 415/200
[58] Field of Search ................ 60/39.091, 223, 60/226.1; 415/9, 173.1, 173.4, 220, 228

[56] References Cited

U.S. PATENT DOCUMENTS

| | | | |
|---|---|---|---|
| 4,397,608 | 8/1983 | Husain et al. | 415/9 |
| 4,425,080 | 1/1984 | Stanton et al. | 60/226.1 |
| 4,500,252 | 2/1985 | Monhardt et al. | 415/9 |
| 4,648,795 | 3/1987 | Lardellier | 415/173.4 |
| 5,160,248 | 11/1992 | Clarke | 415/9 |
| 5,188,505 | 2/1993 | Schilling et al. | 415/9 |

*Primary Examiner*—Louis J. Casaregola
*Attorney, Agent, or Firm*—Edward L. Kochey, Jr.

[57] ABSTRACT

A light weight isogrid containment structure has minor concessions to weight in order to achieve efficient manufacture oversize flanges are permitted in skin thickness interface zones so that manufacture may be accomplished with fewer milling tools and tool changes.

3 Claims, 2 Drawing Sheets

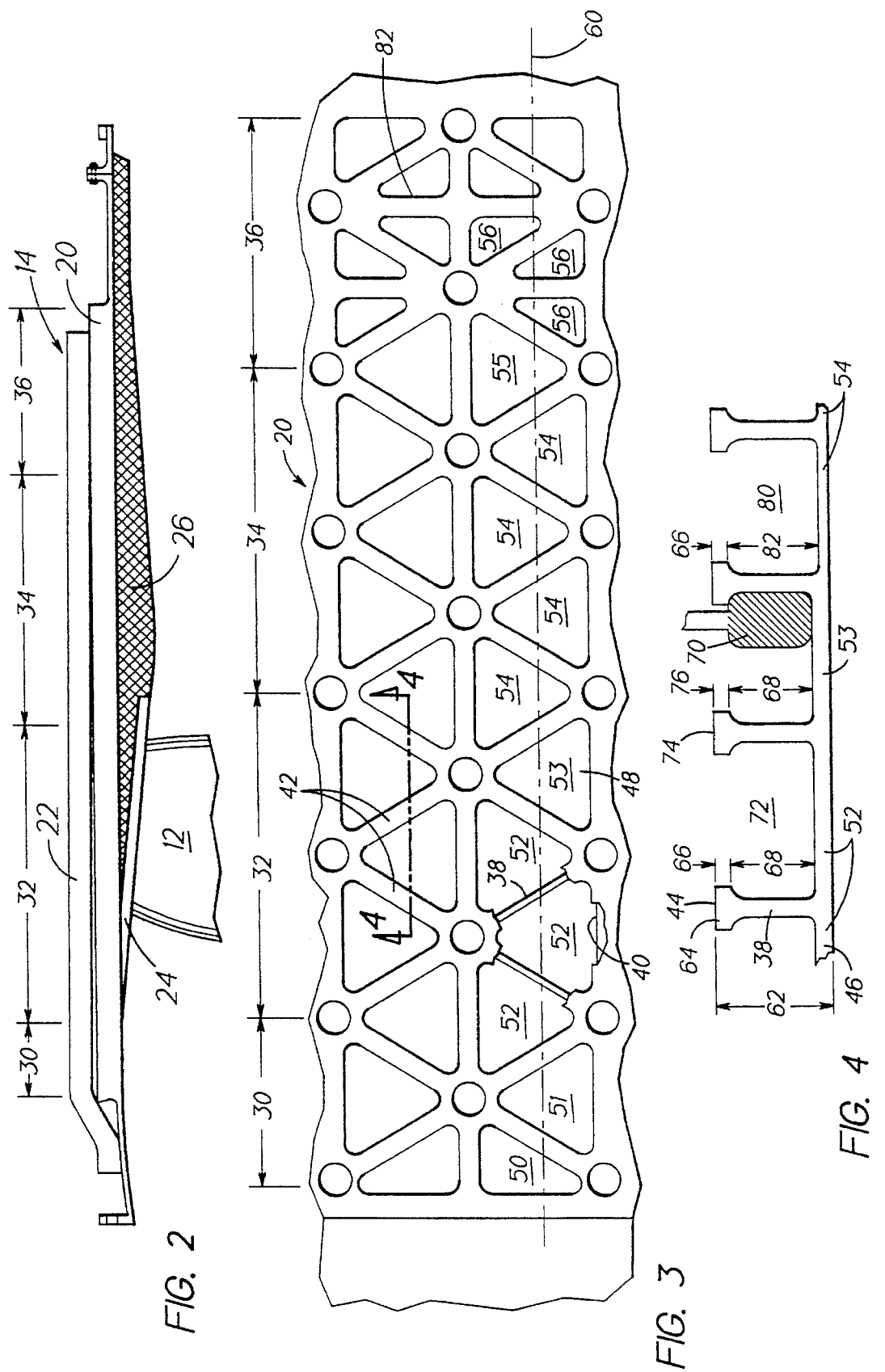

VARIABLE THICKNESS ISOGRID CASE

TECHNICAL FIELD

The invention relates to aircraft turbofan engines and in particular to a structure for containing fractured fan blades which is designed for efficient manufacture.

BACKGROUND OF THE INVENTION

Turbofan aircraft engines have large fans at the forward end. These rotate at a high speed of about 4000 revolutions per minute.

Foreign objects such as birds, hailstones or debris ingested from the ground can occasionally strike the fan blades. It is possible for this to cause the fan blades to fragment with fragments on the order of 7 kilograms traveling at 930 meters per second. It is essential to contain these blade fragments without total destruction of the surrounding casing.

A containment structure of isogrid construction is shown in copending patent application entitled "Aircraft Fan Containment Structure" by Kulak, Dembeck and White. The inner skin of the isogrid's structure as taught there uses differing thicknesses so that proper resistance to blade penetration and rubbing is achieved with a minimum of excess weight. It is also suggested that the change in thickness of the skin not be too abrupt and that there accordingly be interface segments of intermediate thicknesses.

In accordance with the usual design and manufacturer of such a structure, the bulk of each triangular segment, of which there are over 1000, is machined out with the first tool leaving a skin thickness of the specified amount. A second tool is used to machine away the material under the flange of the flanged ribs around the triangular periphery. Conventionally all flanges are specified with the same thickness and accordingly when the skin thickness changes a different tool must be used to mill away the material under the flange.

The manufacturing procedure involves placing the particular tool in the milling machine and milling the isogrid segments of the entire case which used that particular dimension. The approximately 3 meter diameter case is fully rotated to achieve the access to all the appropriate segments the tool must then be changed and the apparatus repositioned for the next tool.

This requirement for multiple tools has been shown to incur considerable expense and take a lot of time. Accordingly it would be desirable to have a modified design which could be manufactured with fewer different milling tools without substantially increasing the weight.

SUMMARY OF THE INVENTION

A cylindrical isogrid structure is designed for light weight. Skin thickness varies as required. Optimally the thickness of all the isogrid flanges or caps should be the same. This leads to a relatively high cost machining operation.

Interface skin thickness sections, of which there are only a few have associated therewith overly thick flanges. The thin aft zone also has excess thickness in the flange, but high stiffness is required here to resist blade fragment rebound forces.

BRIEF DESCRIPTION OF THE DRAWINGS

FIG. 2 is a section through the casing showing its relationship to the fan blade;

FIG. 3 is a view of the isogrid; and

FIG. 4 is a section 41—4 of FIG. 3 showing several adjacent sections.

DESCRIPTION OF THE PREFERRED EMBODIMENT

Figure 1:
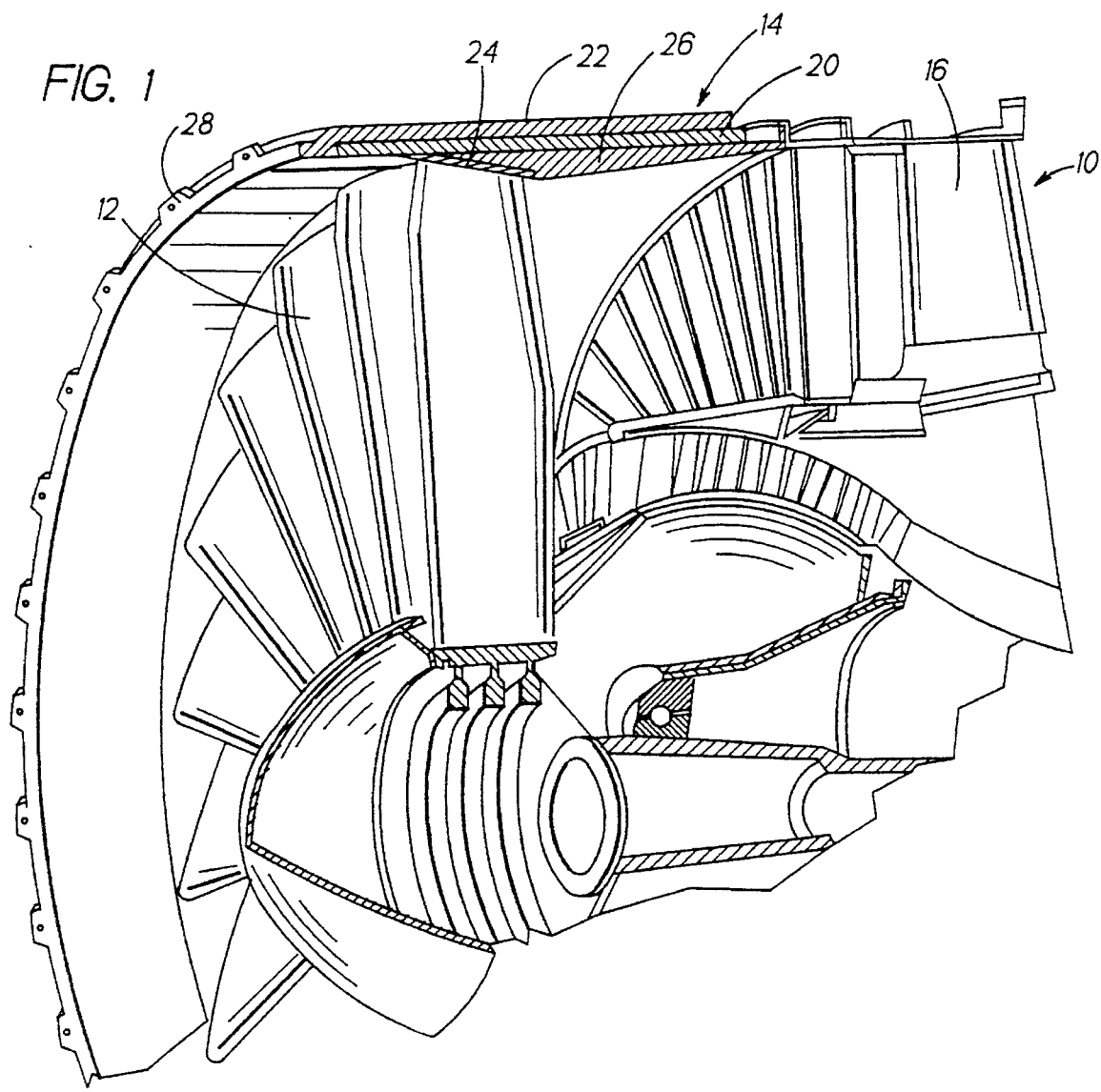
FIG. 1 is an isometric view of a gas turbine engine turbofan.

Referring to FIG. 1 the turbofan aircraft gas turbine engine 10 has a plurality of rotating fan blades 12 at the forward end. A case 14 of abut 2.4 meters diameter, surrounds these lades being supported by struts 16. The case has an isogrid structure 20 with aluminum sheet metal plate bonded thereto, surrounded by multiple wraps of ballistic woven fabric 22. It also contains on a radially inside surface a wear strip 24 and a sound deadening honeycomb 26.

FIG. 2 is a section through case 14. At the forward end of the case there is a forward containment zone 30 which is upstream of the blade 12. Downstream of the forward containment zone is the inplane containment zone 32. This extends well into the zone of the blade 12, but need not extend all the way to the rear end of the blade. An aft containment zone 34 follows this and ultimately the support zone 36.

FIG. 3 is a view of the isogrid showing these same zones. The isogrid is formed of a plurality of ribs 38 in isometric triangular form. Each rib is flanged with cap or flange 44 located at the radially outside edge of the isogrid, with an inside chin 46 integral with the rib structure (FIG. 4).

A plurality of skin segments 48 are formed by the ribs. The thickness of the various skin segments varies in order to save weight while still providing adequate containment of liberated fragments, minimizing the size of the hole created by the released blade and minimizing casing cracking under impact and imbalanced loads. Also of concern is adequate stiffness to prevent case buckling under the wrapped fabric load, the retention load and blade fragment rebound load. There must also be adequate case stiffness for resonance margin arid must avoid buckling because of the cantilevered load from support struts 16. The structure must also provide a bearing surface for the unbalanced fan rotor which will be experienced after a fan blade is lost. The engine must be able to coast to a stop without disintegration of the case.

The forward skin segment 50 is 3.81 millimeters thick with skin casing 51 being 4.83 millimeters thick. As we approach the fan containment zone, skin casing segments 52 are 5.72 millimeters thick. As we progress toward the aft end of the casing segment 53 is 4.83 millimeters thick and segments 54 are 3.81 millimeters thick. Finally segments 55 and 56 are 2.92 and 2.03 millimeters thick respectively.

Adjacent skin segments across ribs do not differ form the adjacent segment by more than 30% in the containment zones subject to blade penetration, these being the forward containment zone, the inplane containment zone and the aft containment zone. In the rear support zone adjacent thickness does not vary more than 50%. It has been found that excessive thickness differences across the rib has caused the openings formed by the penetrating blade to follow crack lines and be larger than desirable.

Centerline 60 of FIG. 3 passes through an axial row of triangular segments. In tracing from the forward end to the aft end there is one section 50 of 3.81 millimeters thickness followed by section 51 of 4.83 millimeters. Three sections 52 follow at 5.72 millimeters and then a single section 53 which is 4.83 millimeters this being the same as 51.

Following this there is a grouping of four sections 54, each of these being 3.81 millimeters in thickness which is the same as the forward triangular section 50. Thereafter follows a single section 55 of 2.92 millimeters thickness. There follows five reduced size triangular sections of 2.03 millimeters each.

FIG. 4 shows the isogrid structure of an overall thickness 62 of 3.45 centimeters. Flange 64 is the normally specified flange having a thickness 66 of 0.37 cm based on the overall stiffness required of the isogrid structure. With the skin 52 being 5.72 millimeters thick the required rib height 68 is 2.51 centimeters. Milling cutter 70 has this height and is used to machine away the edges of ribs 38 in pocket 72. This provides the design requirements.

If the conventional design were to be used flange 74 would be of the same thickness, namely that of thickness 66. In that case the milling tool 70 could not be used but a new tool would have to be substituted. At the expense of slight excess weight flange 74 has an increased thickness 76 commensurate with the reduced thickness of skin 53 so that the same rib height 68 may be used.

Referring back to FIG. 3 the excess thickness on one side of the flange occurs only in the transition sections 51, 53 and 55. To be sure there is also excess web thickness in sections 56, but this is a section that requires additional stiffness because of rebound forces from the blade.

In a manner similar to pocket 72, pocket 80 is designed with the same flange thickness 68 for the decreased skin thickness 54 resulting in a larger cutter to machine the rib height 82. This full size cutter is used for the following sections which also have the same skin thickness.

While excess weight is tolerated because of the minimal use of plurality of cutters, such weight is only located in either the few interface zones or in the aft portions where additional circumferential ribs 82 are already being supplied because of the need for additional stiffness.

We claim:

1. A cylindrical isogrid fan containment case for a turbofan gas turbine engine comprising:

said case formed of an isogrid having a lattice of flanged ribs in isometric triangular relationship and having flanges on the outside edge of each rib;

a skin on the inside edge of said isogrid whereby triangular isogrid segments are formed between said ribs, thereby forming a plurality of axial rows of triangular segments;

a constant isogrid total thickness consisting of a skin thickness, a rib height plus a flange thickness; and different triangular isogrid segments having different skin thicknesses and flange thicknesses, but the same rib height.

2. An isogrid fan containment case as in claim 1, wherein each axial row of triangular segments comprises:

a first plurality of contiguous segments of a first skin thickness;

a second plurality of contiguous segments of a second skin thickness;

an intermediate segment of a skin thickness intermediate said first skin thickness on said second skin thickness; and the rib height of said intermediate segment being equal to the rib height of one of said first plurality and contiguous segments of said second plurality of contiguous segments.

3. A containment case as in claim 2, further comprising:

a plurality of aft segments at an aft location of lesser skin thickness than both said first and second skin thicknesses; and said rib height of said aft segments being a minimum of all rib heights of forward locations.

\* \* \* \* \*